United States Patent
Stoll et al.

(10) Patent No.: US 10,761,071 B2
(45) Date of Patent: Sep. 1, 2020

(54) ARTIFACT COMPENSATION DUE TO DIFFERENT PROPERTIES OF FLUID ACCOMMODATION VOLUMES IN SAMPLE SEPARATION APPARATUS

(71) Applicant: Agilent Technologies, Inc., Santa Clara, CA (US)

(72) Inventors: Dwight Robert Stoll, Karlsruhe (DE); Konstantin Shoykhet, Karlsruhe (DE); Klaus Witt, Keltern (DE); Stephan Buckenmaier, Ettlingen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 132 days.

(21) Appl. No.: 15/558,117

(22) PCT Filed: Mar. 10, 2016

(86) PCT No.: PCT/IB2016/051361
§ 371 (c)(1),
(2) Date: Sep. 13, 2017

(87) PCT Pub. No.: WO2016/147083
PCT Pub. Date: Sep. 22, 2016

(65) Prior Publication Data
US 2018/0052141 A1   Feb. 22, 2018

(30) Foreign Application Priority Data
Mar. 13, 2015   (GB) .................................. 1504310.2

(51) Int. Cl.
*G01N 30/34*   (2006.01)
*G01N 30/46*   (2006.01)
*G01N 30/20*   (2006.01)

(52) U.S. Cl.
CPC ............. *G01N 30/34* (2013.01); *G01N 30/20* (2013.01); *G01N 30/463* (2013.01); *G01N 30/465* (2013.01); *G01N 2030/207* (2013.01)

(58) Field of Classification Search
None
See application file for complete search history.

(56) References Cited

U.S. PATENT DOCUMENTS

| | | | |
|---|---|---|---|
| 2003/0110000 A1* | 6/2003 | Quimby | G01N 30/8665 702/89 |
| 2005/0170362 A1* | 8/2005 | Wada | B01L 3/502753 435/6.13 |
| 2015/0226711 A1* | 8/2015 | Sims | G01N 30/32 73/61.56 |

FOREIGN PATENT DOCUMENTS

| | | |
|---|---|---|
| CN | 103675156 A | 3/2014 |
| CN | 104395748 A | 3/2015 |

(Continued)

OTHER PUBLICATIONS

International Search Report dated Jun. 24, 2016 from related International Application No. PCT/IB2016/051361.

*Primary Examiner* — Matthew D Krcha

(57) ABSTRACT

A control device for controlling at least part of a sample separation apparatus for separating a fluidic sample, the sample separation apparatus including at least two fluid accommodation volumes having different flow through properties and each being configured for temporarily accommodating fluidic sample, wherein the control device is configured for controlling operation of at least part of the sample separation apparatus for at least partially compensating sample separation artifacts resulting from the different flow through properties of the fluid accommodation volumes.

20 Claims, 4 Drawing Sheets

(56) References Cited

FOREIGN PATENT DOCUMENTS

| | | |
|---|---|---|
| DE | 102013114921 A1 | 5/2014 |
| DE | 102014106883 A1 | 10/2014 |
| DE | 102014110865 A1 | 12/2014 |
| EP | 2703808 A1 | 3/2014 |
| GB | 2544135 A | 5/2017 |
| WO | 2012175111 A1 | 12/2012 |
| WO | 2014000778 A1 | 1/2014 |
| WO | 2014199201 A1 | 12/2014 |

* cited by examiner

US 10,761,071 B2

ARTIFACT COMPENSATION DUE TO DIFFERENT PROPERTIES OF FLUID ACCOMMODATION VOLUMES IN SAMPLE SEPARATION APPARATUS

RELATED APPLICATIONS

This application is the national stage under 35 U.S.C. 371 of International Application No. PCT/IB2016/051361, filed Mar. 10, 2016, titled "ARTIFACT COMPENSATION DUE TO DIFFERENT PROPERTIES OF FLUID ACCOMMODATION VOLUMES IN SAMPLE SEPARATION APPARATUS", which claims priority to GB Application No. GB 1504310.2, filed Mar. 13 2015, the entire contents of both of which are incorporated herein by reference.

BACKGROUND ART

The present invention relates to a control device for and a method of controlling a sample separation apparatus for separating a fluidic sample, and relates to a sample separation apparatus.

In liquid chromatography, a fluidic sample and an eluent (liquid mobile phase) may be pumped through conduits and a column in which separation of sample components takes place. The column may comprise a material which is capable of separating different components of the fluidic sample. Such a packing material, so-called beads which may comprise silica gel, may be filled into a column tube which may be connected to other elements (like a sampler, a detector) by conduits.

Two-dimensional separation of a fluidic sample denotes a separation technique in which a first separation procedure in a first separation unit is performed to separate a fluidic sample into a plurality of fractions, and in which a subsequent second separation procedure in a second separation unit is performed to further separate at least one of the plurality of fractions into sub-fractions. Two-dimensional liquid chromatography (2D LC) may combine two liquid chromatography separation techniques and plot the time dependency of detection events along two orthogonal time axes.

Two-dimensional liquid chromatography apparatuses are powerful, but are more prone to artifacts in a chromatogram.

SUMMARY

It is an object of the invention to enable sample separation with a high precision.

According to an exemplary embodiment of the present invention, a control device (such as a processor) for controlling at least part of a sample separation apparatus for separating a fluidic sample is provided, wherein the sample separation apparatus comprises at least two fluid accommodation volumes, which may have different flow through properties and each being configured for temporarily accommodating fluidic sample (in particular for temporarily accommodating fluidic sample which flows through the respective fluid accommodation volume, for instance driven by a fluid drive unit of the sample separation apparatus), wherein the control device is configured for controlling operation of at least part of the sample separation apparatus for at least partially compensating sample separation artifacts resulting from the different flow through properties of the at least two fluid accommodation volumes.

According to another exemplary embodiment of the present invention, a sample separation apparatus for separating a fluidic sample into a plurality of fractions is provided, wherein the apparatus comprises a fluid drive unit configured for driving a fluid comprising a mobile phase and the fluidic sample in the mobile phase along a fluidic path, a separation unit arranged within the fluidic path and configured for separating the fluidic sample into the plurality of fractions, at least two fluid accommodation volumes, which may have different flow through properties, wherein different portions of the fluidic sample are to be guided through the different fluid accommodation volumes, and a control device having the above-mentioned and/or below-mentioned features for at least partially compensating sample separation artifacts resulting from the different flow through properties of the at least two fluid accommodation volumes.

According to another exemplary embodiment of the present invention, a sample separation apparatus for carrying out a series of separations of a fluidic sample is provided, wherein the sample separation apparatus comprises a primary stage comprising a source of fluidic sample (for example a primary stage sample separation apparatus for separating the fluidic sample prior to a subsequent further separation of the fluidic sample by a secondary stage sample separation device), a secondary stage sample separation device fluidically coupled to (for instance arranged downstream of) the primary stage and configured for separating at least a portion of the fluidic sample supplied (and optionally pre-separated) by the primary stage, at least two fluid accommodation volumes having different flow through properties, wherein different sequential portions of the fluidic sample are to be guided through the different fluid accommodation volumes prior to the separation by the secondary stage sample separation device, and a control device having the above-mentioned features for at least partially compensating sample separation artifacts resulting from the different flow through properties of the at least two fluid accommodation volumes.

According to another exemplary embodiment of the present invention, a sample separation apparatus for carrying out a multiple stage (in particular a two-dimensional) separation of a fluidic sample is provided, wherein the sample separation apparatus comprises a primary stage sample separation device for separating the fluidic sample, a secondary stage sample separation device fluidically coupled to the primary stage sample separation device and configured for further separating at least a portion of the fluidic sample supplied and pre-separated by the primary stage sample separation device, at least two fluid accommodation volumes, which may have different flow through properties, wherein different portions of the fluidic sample are to be guided (or conducted or pumped) through the different fluid accommodation volumes after separation by the primary stage sample separation device and prior to the further separation by the secondary stage sample separation device, and a control device having the above-mentioned features for at least partially compensating sample separation artifacts resulting from the different flow through properties of the at least two fluid accommodation volumes.

According to another exemplary embodiment of the present invention, a method of controlling at least part of a sample separation apparatus for separating a fluidic sample is provided, wherein the sample separation apparatus comprises at least two fluid accommodation volumes, which may have different flow through properties (for instance which may have not completely balanced flow through properties) and each being configured for temporarily accommodating fluidic sample, wherein the method comprises controlling operation of at least part of the sample separation apparatus for at least partially compensating sample separation artifacts resulting from the difference in flow through properties of the at least two fluid accommodation volumes.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance small mass molecules or large mass biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.) or more finely separated by the first separation criterion (under improved conditions), thereby further separating different molecules or particles of a fraction.

In the context of this application, the term "sample separation apparatus" may particularly denote any apparatus which is capable of separating different fractions of a fluidic sample by applying a certain separation technique. Particularly, two separation units may be provided in such a sample separation apparatus when being configured for a two-dimensional separation. This means that the sample is first separated in accordance with a first separation criterion, and at least one or some of the fractions resulting from the first separation are subsequently separated in accordance with a second, preferably different, separation criterion or more finely separated in accordance with the first separation criterion. The term "separation unit" may particularly denote a fluidic member through which a fluidic sample is transferred and which is configured so that, upon conducting the fluidic sample through the separation unit, the fluidic sample will be separated into different groups of molecules or particles. An example for a separation unit is a liquid chromatography column which is capable of trapping or retarding and selectively releasing different fractions of the fluidic sample.

In the context of this application, the term "fluid accommodation volume" may particularly denote a defined portion or section of a flow path, a fluidic conduit or a fluidic member (such as a fluidic valve) in which a predefined amount of fluid may be at least temporarily accommodated. In an embodiment, the fluid accommodation volumes may be sample loops fluidically connected to ports of a modulator valve. In an embodiment, the fluid accommodation volume may be at least temporarily fluidically decoupled from a fluidic environment such as a fluid communication network. By a switching mechanism, it may be first coupled to a certain location in a fluid communication network, while later then coupled to a different location in a fluid communication network.

In the context of this application, the term "flow through properties" may particularly denote physical and/or chemical properties of a respective fluid accommodation volume being indicative of the capability of a fluid to flow through the respective fluid accommodation volume, for example under the impact of a certain pressure or drive force. One important parameter which may have an impact on the flow through properties of a fluid accommodation volume is a fluidic restriction or flow restriction to which the fluid is subjected when flowing through the fluid accommodation volume. These "flow through properties" may be "internal" properties given by e.g. geometry or shape, or "external" properties like ambient temperature or flow orientation with respect to e.g. gravity. Flow through properties may relate to geometrical properties (such as a cross-section, a volume, a restriction of a fluidic conduit) and/or may relate to time-related properties (such as different time intervals which different partial flows of a fluidic sample require to flow through a respective conduit or flow path, for example caused by tolerances and/or valve switching).

In the context of this application, the term "sample separation artifacts" may particularly denote one or more features in sample separation result data which features distort, render inaccurate or even falsify the result of a sample separation analysis. For instance, for the example of a two-dimensional liquid chromatography apparatus as sample separation apparatus, such artifacts may be dislocation, (for instance systematic) ripples or binary jitter in a chromatogram. More generally, sample separation artifacts may be time shifts of sample related features (such as peaks) in sample separation result data which time shifts result from a discrepancy between an actual starting time of a separation and an expected starting time of the separation caused by the different flow through properties. In terms of separation by chromatography, retention times of fractions of the fluidic sample may vary from sample insertion procedure to sample insertion procedure, since the respective starting times for the sequential sample insertion procedures vary. The term "sample separation artifacts", in particular when related to jitter, can also be denoted as differences in retention times which occur when portions of the same fluidic sample (in a certain solvent composition as mobile phase) are alternatingly introduced in one fluid accommodation volume (such as a first loop) and in the other fluid accommodation volume (such as a second loop), the two mentioned fluid accommodation volumes having different flow through properties. Under ideal conditions, i.e. identical flow through properties of the two mentioned fluid accommodation volumes, the retention times for sample material flowing through the different fluid accommodation volumes would be identical (this would hold for all fractions of the fluidic sample). Under real condition however, differences between the retention times can be caused by different starting times of the different pieces of sample material resulting from different flow through properties of the different fluid accommodation volumes (such as non-identical flow conditions in the two loops), in particular while different pieces of fluid material simultaneously flow in parallel through the different fluid accommodation volumes.

Still referring to the term "sample separation artifacts", it is to be understood that an outcome of a chromatographic separation (i.e. a chromatogram) is a trace of an eluate property versus time or versus passed volume, which eluate property correlates with concentration of the sample components. It is thus clear, that the chromatogram is decisively effected (along with other factors) by the relations between a reference point (in time or volume) representing the start of separation, the point (in time or volume) of the arrival of the sample onto the separation unit and the point (in time or volume) of the arrival of a solvent gradient onto the separation unit. Arrival of the sample and of the gradient onto the separation unit may be determined by any characteristic feature of the corresponding fluid portion, for example the first mathematical moment of the sample zone and the start of the gradient (e.g. tangents intersection of the initial solvent composition and of the first gradient section in a plot versus time or volume). The effect of variation in the said relation may reach from just differences in the position of the features in the chromatogram (e.g. retention times of the peaks) up to variation of the shape of the features (e.g. peak distortion, changes in chromatographic resolution, etc). The relation between the three said features may be influenced by the flow-through properties in the accommodation volumes. In the case the accommodation volumes are engaged in an alternating manner, the variation in their flow-through properties would result in an alternating (binary) jitter in a series of separations (e.g. in a sequence of the runs in a second dimension in two-dimensional liquid chromatography, 2D-LC). Once there are more than two different accommodation volumes engaged, each of the accommodation volumes might influence the chromatogram in its specific manner. In the context of this application, the term "sample separation artifacts" may particularly denote the result in the chromatogram of such influence of the flow-through properties in the accommodation volumes, more specifically a deviation, caused by such influence, of a real chromatogram from an idealized or reference chromatogram.

According to an exemplary embodiment, a control of the operation of a sample separation apparatus may take into account the impact of different flow through properties of different fluid accommodation volumes involved in a sample separation. Since, for example due to technical tolerances, different fluid accommodation volumes (such as sample loops connected to a modulator valve) may differ in terms of the flow through properties (such as flow restriction properties thereof) of a fluidic sample, such discrepancies may have a disturbing impact on the accuracy of the result of the sample separation analysis. This may particularly hold for the situation that partial fluid flows flowing at least temporarily through different fluid accommodation volumes in a certain operation mode of the sample separation apparatus shall be combined to a single common flow, for instance upstream of a separation unit in which the actual fluid separation occurs. If a control device of the sample separation apparatus considers such an unequal behavior of different fluid accommodation volumes in terms of flow of fluid therethrough, corresponding artifacts deteriorating the accuracy of the sample separation analysis can be suppressed or even eliminated. This can for instance be done by anticipating the effects of different flow through properties of different fluid accommodation volumes so that the operation of the sample separation apparatus can be adjusted in a way that corresponding artifacts are partially or fully compensated. This can also be done by modeling the effects of different flow through properties of the fluid accommodation volumes so that sample separation result data with artificial features can be numerically or computationally corrected, thereby suppressing or eliminating such artificial features. Hence, the precision of sample separation can be increased.

In the following, further exemplary embodiments of the control device, the sample separation apparatuses, and the method will be explained.

An idea of an exemplary embodiments can be seen in the aspect that binary jitter—which may occur as a consequence of different flow through properties of multiple fluid accommodation volumes (for instance different restrictions of two different loops in a back-and-forth switching operation)—can be avoided or reduced by shifting points of time of commanding switching of a modulator valve to compensate resulting artifacts (additionally or alternatively, a gradient profile may be shifted in time for compensation purposes). More specifically, a faster signal can be delayed stronger than a slower signal. In other words, valve switching may be postponed by a loop restriction dependent delay time (more generally: by a fluid accommodation volume flow through property dependent delay time) for intentionally generating anti-jitter which at least partially compensates the above-mentioned artificial binary jitter. Valve control may hence be adjusted in such a manner that switching times are adapted in accordance with the different restrictions of the loops (more generally: in accordance with the different flow through properties of the fluid accommodation volumes).

In an embodiment, the control device is configured for controlling operation of at least part of the sample separation apparatus for at least partially compensating sample separation artifacts originating from an operation mode of the sample separation apparatus in which partial flows of fluids accommodated in at least two of the at least two fluid accommodation volumes are combined for subsequent separation. When partial flows of fluid through the different fluid accommodation volumes with different flow through properties are to be combined, the resulting single combined fluid flow is stronger influenced (or even dominated) by a partial flow originating from a fluid accommodation volume having a smaller fluidic restriction than by another partial flow resulting from another fluid accommodation volume having a larger fluidic restriction. This has an impact on the timing characteristic (and may result in a geographic dislocation of sample fractions when introduced into the column flow) and composition of the combined flow to be subsequently separated into fractions. By adapting operation of the sample separation apparatus to consider and correct (at least partly) for the impact of different flow through properties on the separation procedure, the accuracy of the sample separation may be increased by suppressing artifacts.

In an embodiment, the control device is configured for controlling operation of at least part of the sample separation apparatus for at least partially compensating sample separation artifacts by, in accordance with the different flow through properties, adjusting a timing (in particular of start and/or end) of introduction of fluidic sample from at least part of the at least two fluid accommodation volumes into a flow path towards a separation unit of the sample separation apparatus. By adapting time intervals of partial flow combination taking into account the effects of different flow through properties of different fluid accommodation volumes, the accuracy of the sample separation may be improved.

In an embodiment, the control device is configured for controlling operation of at least part of the sample separation apparatus for at least partially compensating sample separation artifacts by adjusting a timing (in particular of start and/or end) of applying a mobile phase profile for sample separation in accordance with the different flow through properties. For example, the mobile phase profile (such as a gradient profile) may be started earlier or may be delayed compared to a nominal timing for taking into consideration effects of different flow through properties of individual fluid accommodation volumes. Also this may allow to obtain cleaner separation results.

In an embodiment, the control device is configured for at least partially compensating the sample separation artifacts by adjusting a timing of switching a fluidic switch in fluid communication with the at least two fluid accommodation volumes in accordance with the different flow through properties. Such a fluidic switch may be composed of a static valve member (such as a stator having ports for establishing fluid communication with fluidically coupled fluidic members) and a movable valve member (such as a rotor, being rotatable relative to the stator, having grooves for establishing different fluidic connection between the ports depending on a rotation state of the rotor relative to the stator). When adjusting switching times (which may be time intervals required for switching procedures and/or points of time at which switching is initiated) of a fluidic switch (such as a modulator valve at a fluidic interface between a primary stage sample separation device and a secondary stage sample separation device), it can be possible to suppress artifacts resulting from inhomogeneous flow through properties of different fluid accommodation volumes connected to the fluidic switch with low effort.

In an embodiment, the control device is configured for at least partially compensating the sample separation artifacts by adjusting a mobile phase profile, in particular a mobile phase gradient, according to which the sample separation is executed in accordance with the different flow through properties. Shape and/or timing of such a mobile phase profile can be adapted to compensate the above-mentioned artifacts.

In an embodiment, the control device is configured for at least partially compensating the sample separation artifacts by recalculating sample separation result data in accordance with the different flow through properties. For example, a theoretical or empirical model may be used for simulating the effects of different flow through properties of different fluid accommodation volumes of the sample separation apparatus. Sample separation result data may then be corrected mathematically by numerically removing the effects of the above-mentioned artifacts from the measured data by applying the model before the result is used for regular data analysis.

In an embodiment, the control device is configured for at least partially compensating the sample separation artifacts by performing a numerical baseline correction to thereby correct jitter in sample separation result data in accordance with the different flow through properties. It has turned out that different fluidic restrictions of two usually fluidically parallel buffer volumes (i.e. volumes configured for temporarily storing a certain respective amount of fluid) which, in a certain operation modes of the sample separation apparatus, are triggered to combine their partial flows to a single common flow may have the consequence of ripples in a sample separation result diagram (such as a chromatogram). Such ripples, oscillations or jitter effects are in particular detectable and visible in baseline regions where they can be precisely removed by a baseline correction.

In an embodiment, the different flow through properties are selected from a group consisting of "internal" properties, such as different volume values, different fluidic restrictions, different flow path lengths or shapes, etc., or "external" properties like local ambient temperature or flow orientation with respect to e.g. gravity. In particular, different internal properties may result from tolerances, in particular manufacturing tolerances. However, different flow through properties may also result from hardware effects such as asymmetric valve switching, which may be e.g. backlash, motion speed or event timing.

In an embodiment, the control device is configured for at least partially compensating the different flow through properties of the at least two fluid accommodation volumes by adjusting operation of the sample separation apparatus, in particular by adjusting a valve switching scheme according to which a fluidic valve of the sample separation apparatus is switched. For example, a chromatographic method may be adapted so as to consider and compensate inhomogeneous flow through property based artifacts, for example by shifting the beginning or end of a gradient profile in time and/or by adapting a shape of such a gradient profile.

In an embodiment, the at least two fluid accommodation volumes are fluid buffer volumes each of which being configured for temporarily buffering (or storing) a predefined volume of the fluidic sample during operation of the sample separation apparatus. Such fluid buffer volumes can be implemented advantageously at an interface between a first separation stage and a second separation stage of a two-dimensional (or more general: multidimensional) sample separation apparatus.

In an embodiment, the sample separation apparatus comprises a fluidic modulator valve configured for being switchable for subsequently introducing portions of the fluidic sample originating or eluting from the primary source (for instance a primary stage sample separation device) into the second stage sample separation device. Each of the at least two fluid buffer volumes (which may also be denoted as sample loops) may be fluidically connected to the modulator valve so that different portions of the fluidic sample are temporarily bufferable in the respective fluid buffer volumes.

In an embodiment, the control device is configured for switching the modulator valve so that in a first switching state, only a first one, not a second one of the at least two fluid accommodation volumes is fluidically connected to the secondary stage sample separation device, in a second switching state, only the second one, not the first one of the at least two fluid accommodation volumes is fluidically connected to the secondary stage sample separation device, and in a third switching state (or intermediate switching state), both the first one and the second one of the at least two fluid accommodation volumes are fluidically connected to the secondary stage sample separation device. Such a configuration of a modulator valve, in particular at the fluidic interface between a first dimension and the second dimension of a two-dimensional sample separation apparatus, has the advantage that there is no hard or abrupt transition (which would be accompanied by an undesired temporary interruption of the fluid flow in the second dimension) which may occur when directly switching from the first switching state to the second switching state. In contrast to this, the third switching state (which may also be denoted as transition switching state) can be interleaved between the first switching state and the second switching state and can serve as an overlapping region to ensure a continuous flow in the secondary separation dimension while still allowing to change the fluid accommodation volume presently used as fluid source for the second dimension.

In an embodiment, the control device is configured for at least partially compensating sample separation artifacts occurring in the third switching state. While in the first switching state and in the second switching state different flow through properties of the fluid accommodation volumes do not have a significant impact, the combination of partial flows from the fluid accommodation volumes in the third switching state may be strongly influenced by different flow through properties in the two flow paths to be combined. Therefore, compensation of artifacts due to effects occurring in the third switching state is very effective to significantly improve accuracy.

In an embodiment, the at least partial compensation is carried out by a one-time calibration of the sample separation apparatus, in particular at a factory site. In such an embodiment, an end user does not have to be concerned with artifact compensation. For instance, a calibration run may be executed at the factory site, and the artifact compensation may be set accordingly, e.g. stored in a memory.

In another embodiment, the at least partial compensation is carried out by tuning the sample separation apparatus at a user site. For example after a change of a loop (or any other fluid accommodation volume), a modulator valve or any other fluidic member of the sample separation apparatus, the user may tune operation parameters of the sample separation apparatus to achieve the best possible artifact suppression under the respective circumstances. When flow through properties dynamically change over time, a user may react on temporally changing artifacts by readjusting the artifact compensation.

In an embodiment, the at least partial compensation is carried out by supplying a set of artifact suppressing operation parameters to the sample separation apparatus. These parameters may be kept permanently constant or may be adapted dynamically. For instance, a cloud may centrally manage artifact suppression of many distributed sample separation apparatuses and may centrally calculate, on a broad data basis, appropriate sets of artifact suppressing operation parameters which can be downloaded or transmitted to the respective sample separation apparatus.

In an embodiment, the primary and/or the secondary stage sample separation device is configured as a chromatography sample separation apparatus (in particular a liquid chromatography sample separation apparatus, a gas chromatography sample separation apparatus or a supercritical fluid chromatography sample separation apparatus) or an electrophoretic sample separation apparatus (in particular a capillary electrophoresis sample separation apparatus). However, alternative separating technologies may be applied as well. When the secondary stage sample separation device is configured for liquid chromatography, it can be combined with a primary stage liquid chromatography device to a two-dimensional liquid chromatography apparatus (2D-LC). However, also other combinations of the sample separation techniques are possible, for instance involving electrophoretic sample separation. Advantageously, the primary stage separation and the secondary stage separation are at least partially orthogonal in terms of their respective separation mechanism, i.e. separate the fluidic sample or a fraction thereof in accordance with a different separation criterion or based on a different extent of the same criterion.

In an embodiment, any of the primary and secondary stage sample separation devices may comprise a detector for detecting components of the separated fluidic sample. Such a detector for detecting the individual fractions and subfractions may be arranged downstream of the respective separating unit. Such a detector may operate on the basis of an electromagnetic radiation detection principle. For example, an electromagnetic radiation source may be provided which irradiates the sample passing through a flow cell with primary electromagnetic radiation (such as optical light or ultraviolet light). In response to this irradiation with primary electromagnetic radiation, there will be an interaction of this electromagnetic radiation with the fluidic sample so that this interaction can be detected based on variations in properties of the primary radiation (such as intensity, frequency, spectral distribution, propagation direction, vector of polarization or alike) or based on eventually emerging resulting secondary electromagnetic radiation, the said interaction being indicative of the concentration and/or kind of sample components contained in the fluidic fractions.

In an embodiment, any of the primary and secondary stage sample separation devices may comprise a sample injector for introduction of the fluidic sample into the separation system upstream of the respective separation unit. In such a sample injector of the primary stage, an injection needle may intake a metered amount of fluidic sample into a connected loop. After driving and inserting such an injection needle in a corresponding seat and upon switching a fluid injection valve, the fluidic sample may be injected into the path between a fluid drive and a separating unit. Upon such a switching operation, a mobile phase transported by the fluid drive and constituted by a solvent composition transports the sample to the separation unit and may get partially mixed with the fluidic sample. The secondary stage sample separation device may also be free of a sample injector.

In an embodiment, the primary stage separation unit and the secondary stage separation unit are configured so as to execute the respective sample separation in accordance with different separation criteria, particularly in accordance with at least different or partially orthogonal separation criteria. In this context, the term "orthogonal" may particularly denote the low degree or even lack of correlation between the retention parameters in the first and the second dimension in general or at least for the expected sample components.

In one embodiment, the entire fluidic sample supplied from the primary stage is further separated in the secondary stage. In another embodiment, only a part of the fluidic sample supplied from the primary stage is further separated in the secondary stage. Hence, the secondary stage may be operated in a comprehensive mode or in a heart-cut mode or a combination thereof, like piecewise comprehensive.

The separation unit of any of the stages may be filled with a separating material. Such a separating material which may also be denoted as a stationary phase may be any material which allows a different degree of interaction with sample components so as to be capable of separating different components of such a sample. The separating material may be a liquid chromatography column filling material or packing material comprising at least one of the group consisting of polystyrene, zeolite, polyvinylalcohol, polytetrafluoroethylene, glass, polymeric powder, carbon, graphite, alumina, zirconia, silicon dioxide, and silica gel, or any of above with chemically modified (coated, capped etc) surface. However, any packing material can be used which has material properties allowing a sample passing through this material to be separated into different components, for instance due to different degrees of interactions or affinities between the packing material and fractions of the analyte.

At least a part of any of the separation units may be fluid chambers filled with a separating material, wherein the separating material may comprise beads having a size in the range of essentially 0.1 µm to essentially 50 µm. Thus, these beads may be small particles which may be filled inside the separation section of the fluidic device. The beads may have pores having a size in the range of essentially 0.005 µm to essentially 0.2 µm. The fluidic sample may enter the pores, wherein an interaction may occur between the fluidic sample and the inner surface of the pores.

The sample separation apparatus may be, in any of its stages, configured to conduct mobile phase through the system by means of a high pressure, particularly of at least 400 bar, more particularly of at least 1000 bar.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

Figure 1:
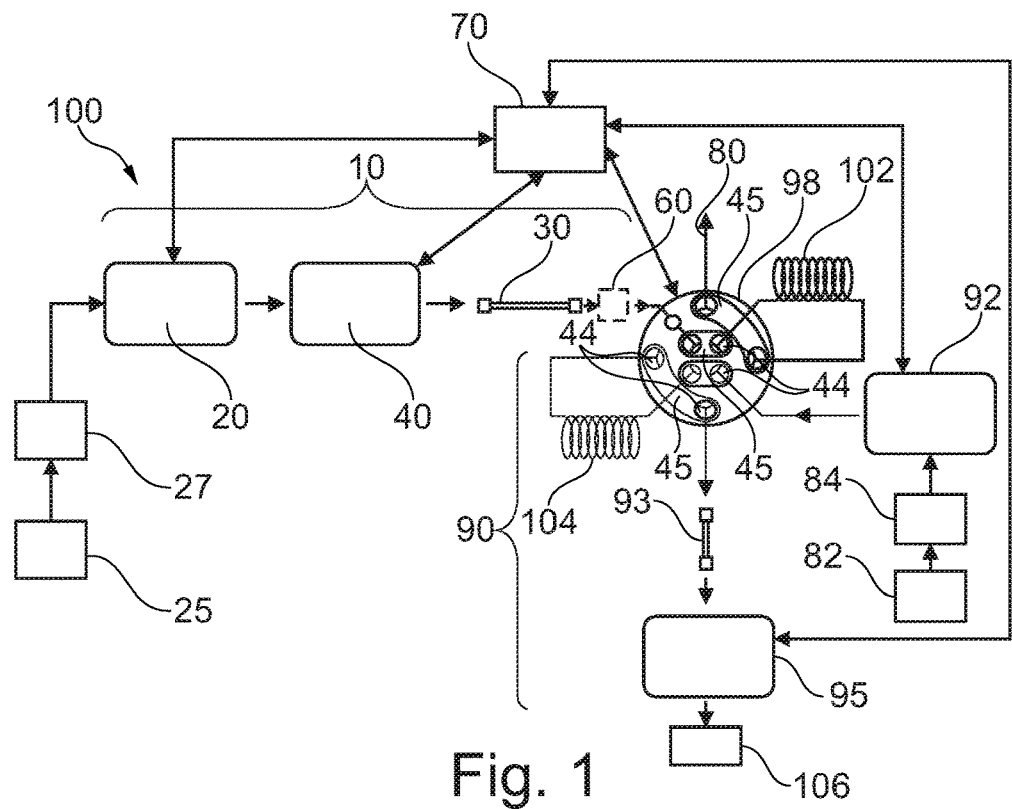
FIG. 1 illustrates a two-dimensional sample separation apparatus according to an exemplary embodiment of the invention.

The illustration in the drawing is schematic.

Figure 2:
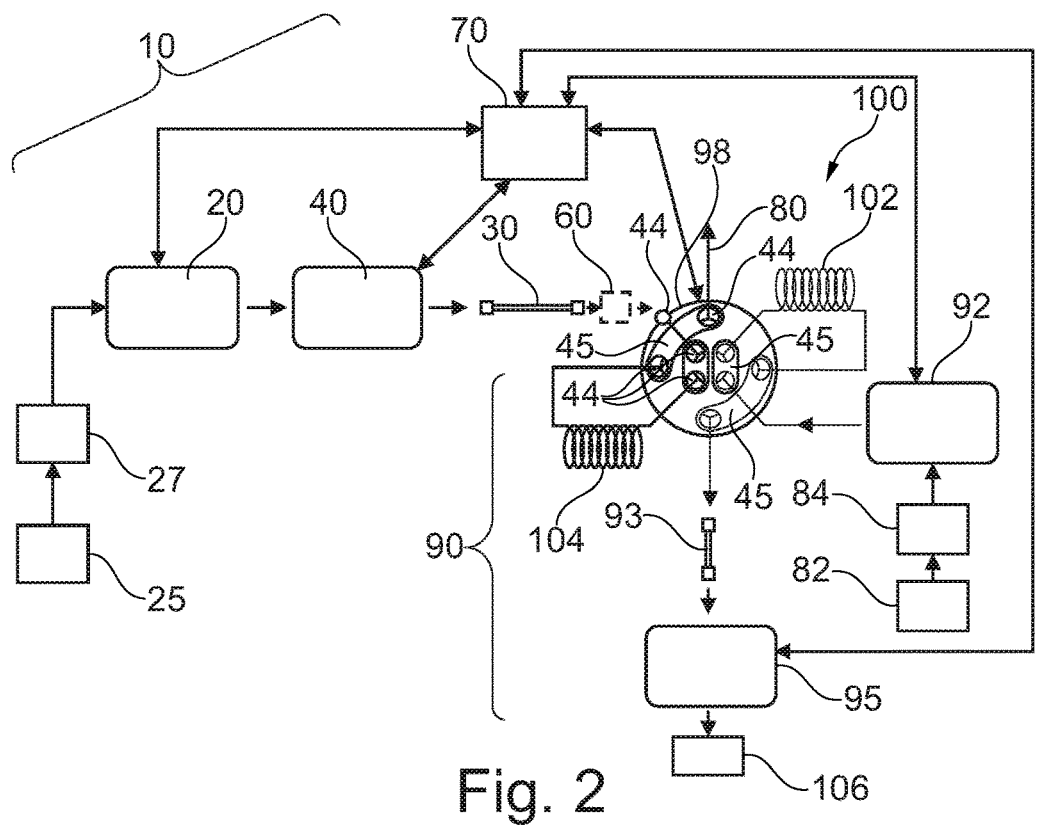
FIG. 2 shows the sample separation apparatus of FIG. 1 in another switching state of a modulator valve thereof.

FIG. 1 illustrates a two-dimensional sample separation apparatus 100 according to an exemplary embodiment of the invention. FIG. 2 shows the sample separation apparatus 100 of FIG. 1 in another switching state of a sampling valve or modulator valve 98 thereof which will be described below in further detail.

FIG. 1 and FIG. 2 depict a liquid chromatography separation system as an example for a sample separation apparatus 100 according to an exemplary embodiment of the invention. A first pump operating as first fluid drive unit 20 receives a mobile phase from a first solvent supply 25, typically via a first degasser 27, which degases the mobile phase and thus reduces the amount of gases dissolved in the mobile phase. The first fluid drive unit 20 drives the mobile phase through a first separating unit 30 (such as a chromatographic column) comprising a stationary phase. A sampling unit or injector 40 can be provided between the first fluid drive unit 20 and the first separating unit 30 in order to subject or add (often referred to as sample introduction) a sample fluid (also denoted as fluidic sample) into the mobile phase. The stationary phase of the first separating unit 30 is configured for separating compounds of the sample liquid.

A second pump, as second fluid drive unit 92, receives another mobile phase from a second solvent supply 82, typically via a second degasser 84, which degases the other mobile phase and thus reduces the amount of gases dissolved in the other mobile phase. By fluidic switch or modulator valve 98 (here embodied as a fluidic valve), the first dimension (reference numerals 20, 30, . . . ) of the two-dimensional liquid chromatography system of FIG. 1 may be configured to provide fluidic segments or portions to the second dimension (reference numerals 92, 93, . . . ). The fluidic sample is separated into multiple fractions by the first dimension constituted by primary stage sample separation device 10, and each fraction, or a part/slice of it, is modulated into the second separation path and further separated into multiple sub-fractions by the second dimension constituted by secondary stage sample separation device 90.

A detector 95 is provided for detecting separated compounds of the sample fluid at the end of the second dimension. An optional further detector 60 may be arranged upstream of the modulator valve 98 and may be used for operating secondary stage sample separation device 90 in a heart-cutting operation. It can however also be used in comprehensive mode as well as in any other operation mode for monitoring or evaluation of the chromatographical data of the first dimension. A fractionating unit 106 can be provided for outputting separated compounds of sample fluid downstream of detector 95. It is also possible that part of the fluid is pumped towards a waste.

While each of the mobile phases can be comprised of one solvent only, it may also be mixed from plural solvents. Such mixing might be a low pressure mixing and provided upstream of the fluid drive units 20, 92, so that the respective fluid drive unit 20, 92 already receives and pumps the mixed solvents as the mobile phase. Alternatively, any of the fluid drive units 20, 92 might be comprised of plural individual pumping units, with the plurality of the pumping units each receiving and pumping a different solvent or mixture, so that the mixing of the mobile phase (as received by the respective separating unit 30, 93) occurs at high pressure and downstream of the respective fluid drive unit 20, 92 (or as part thereof). The composition (mixture) of the mobile phase may be kept constant over time, the so called isocratic mode, or varied over time, the so called gradient mode.

A data processing unit, processor or control device 70, which can also be a PC or workstation, may be coupled to one or more of the devices in the sample separation apparatus 100 in order to receive information and/or control operation. For example, the control device 70 may control operation of the fluid drive units 20, 92 (for instance setting control parameters) and receive therefrom information regarding the actual working conditions (such as output pressure, flow rate, etc. at an outlet of the pump 20,92). The control device 70 may also control operation of the solvent supply 25, 82 (for instance setting the solvent/s or solvent mixture to be supplied) and/or the degasser(s) 27, 84 (for instance setting control parameters such as vacuum level) and may receive therefrom information regarding the actual working conditions (such as solvent composition supplied over time, flow rate, vacuum level, etc.). The control device 70 may further control operation of the sampling unit or injector 40 (for instance controlling sample injection or synchronization of sample injection with operating conditions of the first fluid drive unit 20). The respective separating units 30, 93 may also be controlled by the control device 70 (for instance selecting a specific flow path or column, setting operation temperature, etc.), and send in return information (for instance actual operating conditions) to the control device 70. Accordingly, the detectors 60 and 95 may be controlled by the control device 70 (for instance with respect to spectral or wavelength settings, setting time constants, start/stop data acquisition), and send information (for instance about the detected sample compounds) to the control device 70. The control device 70 may also control operation of the fractionating unit 106 (for instance in conjunction with data received from the detector 95). The control device 70 may include a storage device, which allows to store all or selected information of the analytical process and also to retrieve stored information from previous analytical processes. The control device 70 may include software or firmware for data evaluation and for providing data evaluation results for further storage or as an output for a human interface. As also indicated in FIG. 1, the control device 70 may control the modulator valve 98, i.e. may control its switching performance and a corresponding timing. The control device 70 may control the fluid drive units 20, 92, and may in particular control a timing of applying a gradient profile (or any other desired mobile phase profile) to the system in any of the first dimension and/or the second dimension.

The first fluid drive unit 20 is hence configured for driving a first fluid (composed of the injected fluidic sample and mobile phase) along a first flow path which is located partly upstream of the modulator valve 98 and partly downstream of the modulator valve 98. The second fluid drive unit 92 is configured for driving a second fluid embodied as a mobile phase along a second flow path which is also located partly upstream of the modulator valve 98 and partly downstream of the modulator valve 98. The modulator valve 98 is fluidically coupled to both the first flow path and to the second flow path (however essentially not directly connecting them fluidically together) and is switchable under control of the control device 70 for transferring part of the first fluid from the first flow path into the second flow path without interruption of fluid flow along the first flow path and along the second flow path during this switching operation. No direct fluid connection between the first flow path and the second flow path is provided which otherwise would allow for an unlimited substantial direct fluid flow between the two individual flow paths. More particularly, the modulator valve 98 is switchable between different fluid switching states for transferring the first fluid from the first flow path into the second flow path. The sample separation apparatus 100 shown in FIG. 1 is configured as a two-dimensional sample separation apparatus configured for separating the first fluid into fractions (which can be detected by detector 60) and at least one of the fractions of the transferred first fluid into sub-fractions (which can be detected by detector 95).

As can be taken from FIG. 1 and FIG. 2, the modulator valve 98 has in this case two fluid accommodation volumes 102, 104 acting as buffer volumes or sample loops and being connected to various ports 44 (wherein different ports 44 can be fluidically coupled to one another via grooves 45 of the modulator valve 98, depending on its switching state) thereof so that fluid packets originating from the primary stage can be buffered in the buffer volumes before being supplied to the analytical path of the secondary stage, i.e. between second fluid drive unit 92 and second separation unit 93. In the switching state of the modulator valve 98 according to FIG. 1, the fluid accommodation volume 102 on the upper right-hand side is presently filled with new fluidic sample flowing towards waste 80, whereas the other fluid accommodation volume 104 on the lower left-hand side is presently in the fluidic path between the second fluid drive unit 92 and the second separation unit 93, i.e. fluidic sample previously stored in this other buffer volume or fluid accommodation volume 104 is presently in the process of being further separated. In the switching state of the modulator valve 98 according to FIG. 2, the buffer volume or fluid accommodation volume 104 on the lower left-hand side is presently filled with new fluidic sample, whereas the buffer volume or fluid accommodation volume 102 on the upper right-hand side is presently in the fluidic path between the second fluid drive unit 92 and the second separation unit 93, i.e. fluidic sample previously stored in this buffer volume 102 is presently in the process of being further separated.

Hence, the sample separation apparatus 100 is configured for carrying out a two-dimensional liquid chromatography separation of a fluidic sample by the cooperation of primary stage sample separation device 10 with secondary stage sample separation device 90. According to FIG. 1 and FIG. 2, the two fluid accommodation volumes 102, 104 have different fluidic restrictions as an example for different flow through properties. For instance, the inner diameters of the capillaries or fluidic conduits constituting the respective fluid accommodation volumes 102 and 104 can be different (for instance due to technical tolerances). The higher the fluidic restriction, the more difficult will it be for fluid to be conducted through the respective fluid accommodation volume 102/104 by a certain pressure, i.e. the lower will be the respective flow rate obtainable under defined pressure conditions. In an operation mode of the sample separation apparatus 100 (not shown in FIG. 1 and FIG. 2, see for instance operation mode 320 according to FIG. 5) in which partial flows through the fluid accommodation volumes 102, 104 are to be combined or added to form a single common flow this can cause artifacts in a chromatogram detected by detector 95.

In order to avoid reduction of accuracy of the sample separation procedure due to these artifacts, the above-mentioned control device 70 is configured for compensating sample separation artifacts resulting from the different flow through properties of the fluid accommodation volumes 102, 104. More specifically, the control device 70 is configured for controlling operation of the sample separation apparatus 100 for compensating sample separation artifacts originating from an operation mode (see reference numeral 320) of the sample separation apparatus 100 in which partial flows of fluidic sample accommodated in the fluid accommodation volumes 102, 104 are combined after separation in the first dimension for subsequent further separation in the second dimension.

To achieve this, the control device 70 may apply one or more of the following compensation procedures:
- adjust a timing of start and/or end times of the operation mode 320 during which the partial flows are combined in accordance with the different flow through properties by a corresponding switching operation of modulator valve 98
- adjust a timing of applying a gradient profile for sample separation in the second dimension in accordance with the different flow through properties
- mathematically correct sample separation result data in accordance with the different flow through properties (for instance baseline correction to thereby correct binary jitter caused by the different flow through properties in periodic operation)

The compensation may be carried out selectively:
- by a one-time calibration of the sample separation apparatus 100 at a factory side, for instance during a calibration of the sample separation apparatus 100
- by tuning the sample separation apparatus 100 at a user side, for instance after a loop change or on the occasion of the determination of jitter in a chromatogram by supplying a set of artifact suppressing operation parameters to the sample separation apparatus 100 (for instance from a local database or from a cloud)

In the following, a more general description of the compensation logic according to exemplary embodiments of the invention will be explained. After that, referring to FIG. 3 to FIG. 10, some specific examples will be illustrated.

A gist according to an exemplary embodiment of the invention is to carry out a controlled valve motion adjustment to align physical injection of sample into a flow stream with a regular timing grid. This can be done to prevent or at least reduce artifacts in measurement data, such as a binary pattern which is introduced by physical characteristics such as differences in loop restrictions, geometric tolerances of valve components, or asymmetry in motions of the valve.

In comprehensive two-dimensional liquid chromatography, it has been a common configuration to use a binary set of loops to splice fractions of the fluid exiting the first dimension separation column (i.e., the fluidic sample for the second dimension) into the flow path of the second dimension. Especially when operating the second dimension separation at higher speed, for instance less than 1 min cycling/switching of the modulator valve, it will become increasingly evident that the individual behavior of the two flow paths through the valve are not exactly identical.

Based on the foregoing, the present inventors have developed the concept that triggering of the valve motion can be adjusted so that the resulting placement of the sample slice into the flow stream becomes exactly predictable and possibly equal for both (or all of the plurality) of the loops (or more generally: fluid accommodation volumes). This can be done for example in one or more of the following ways:

1. Provide a configuration setting, which allows to tweak the system. For example, a user may watch results and may improve or even optimize performance by setting a value (or a set of values).

2. Check the actual behavior and calibrate based on measurement results:
   Run a specific protocol, wherein a result may be stored with a specific unit.
   Can be factory calibrated.

3. Measurement on individual components (for example stored on tags):
   Adjust for a most significant deviation
   Combination of multiple parameters is possible, as by design
   No calibration measurement on the final instrument is actually needed 4. Adjust the surrounding behavior:
   Trigger the valve as is (i.e., according to a regular, repetitive schedule), but instead adjust the triggering of other events affecting analyte elution (for instance solvent gradient start time and slope)
   This implementation may require stamping the actual start into an asynchronous part of a data file for subsequent use in data analysis FIG. 3 is an illustration of a dual loop sampling valve as modulator valve 98 for a two-dimensional liquid chromatography sample separation apparatus 100.

Figure 3:
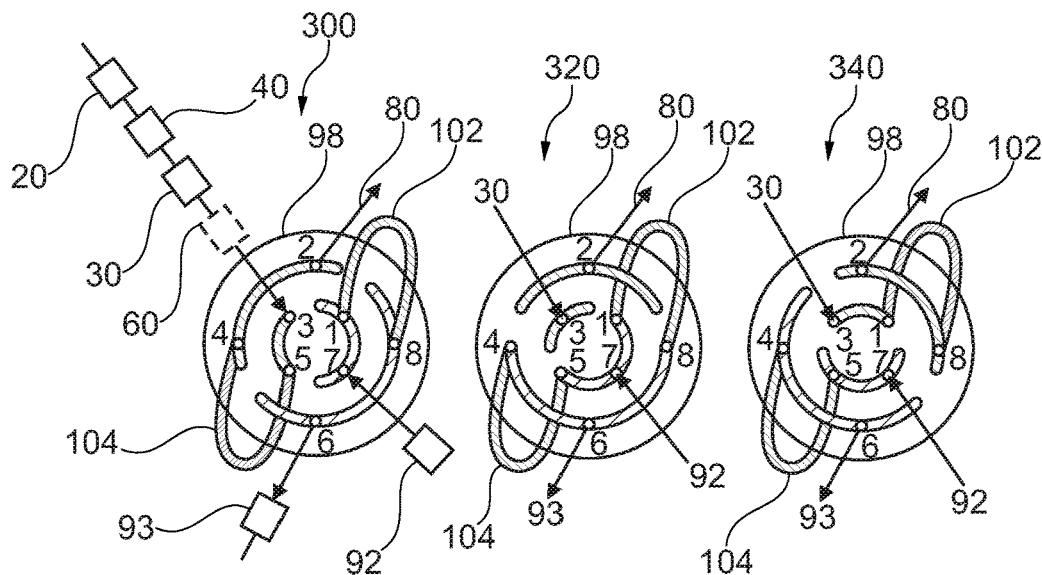
FIG. 3 is an illustration of a dual loop sampling valve for two-dimensional liquid chromatography, wherein both sample loops, as an example for fluid accommodation volumes, ideally have identical flow through properties.

FIG. 3 shows modulator valve 98 in three different switching states, each of which being selectable under control of control device 70. Hence, control device 70 can switch the modulator valve 98 so that in a first switching state 300, only a first one (see reference numeral 102), not a second one (see reference numeral 104) of the fluid accommodation volumes 102, 104 is fluidically connected to the secondary stage sample separation device 90. In a second switching state 340, only the second one (see reference numeral 104), not the first one (see reference numeral 102) of the fluid accommodation volumes 102, 104 is fluidically connected to the secondary stage sample separation device 90. In addition, control device 70 is also capable of switching the modulator valve 98 in a third switching state 320 (which can also be denoted as intermediate state), in which both fluid accommodation volumes 102, 104 are fluidically connected to the secondary stage sample separation device 90. Consequently, the partial flows of fluids from the individual fluid accommodation volumes 102, 104 are combined to a combined flow stream to the separation unit 93 of the second dimension during this third switching state 320. This switching scheme has the advantage that, thanks to the third switching state 320, the flow of fluid in the second dimension is never interrupted.

FIG. 3 relates to the ideal case of a dual loop valve operation in which a fluid flow from fluid drive unit 92 of the second dimension to the separation unit 93 of the second dimension proceeds for a certain time through both loops or fluid accommodation volumes 102, 104, and thus both loops are connected in parallel, and a certain amount of mobile phase of the second dimension gets admixed to the fluidic sample arriving at separation unit 93, while originating from the separation unit 30 of the first dimension.

Since, according to the ideal situation illustrated in FIG. 3, both fluid accommodation volumes 102, 104 are completely identical in terms of flow through properties (in particular their fluidic restrictions), there is no need for a compensation of artifacts. However, the assumption of completely identical fluid accommodation volumes 102, 104 is highly hypothetical, if not merely theoretical, since technical tolerances, different and varying internal and external conditions, etc. will result in the great majority of cases in at least slightly different flow through properties.

Figure 4:
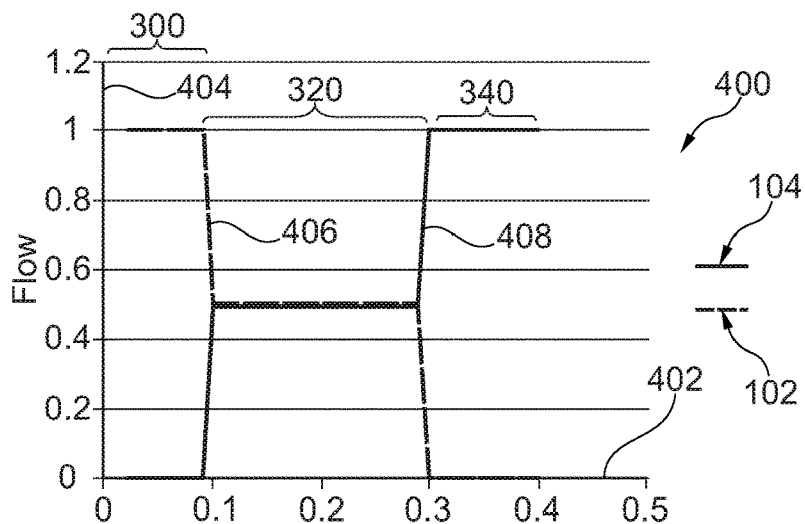
FIG. 4 is a diagram showing a contribution of flow through each sample loop, according to FIG. 3, to the total second dimensional flow as a function of time.

FIG. 4 shows a diagram 400 having an abscissa 402 along which the time during operation of a sample separation apparatus 100 is plotted. Along an ordinate 404, the flow of fluid into the second separation stage is plotted. A first curve 406 relates to fluid accommodation volume 102, whereas a second curve 408 relates to fluid accommodation volume 104. In FIG. 4, time intervals relating to the three switching states 300, 320, 340 are shown.

FIG. 4 therefore illustrates contributions of flow through each sample loop to the total second dimension fluid flow as a function of time. Here, the valve switching period (corresponding to third switching state 320) runs from 0.1 to 0.3, and between these times there is (equal) flow through both loops that are connected in parallel to both the fluid drive unit 92 of the second dimension and the separation unit 93 of the second dimension.

However, as already mentioned above, the scenario of FIG. 3 and FIG. 4 relates to identical flow through properties of the two fluid accommodation volumes 102, 104.

Figure 5:
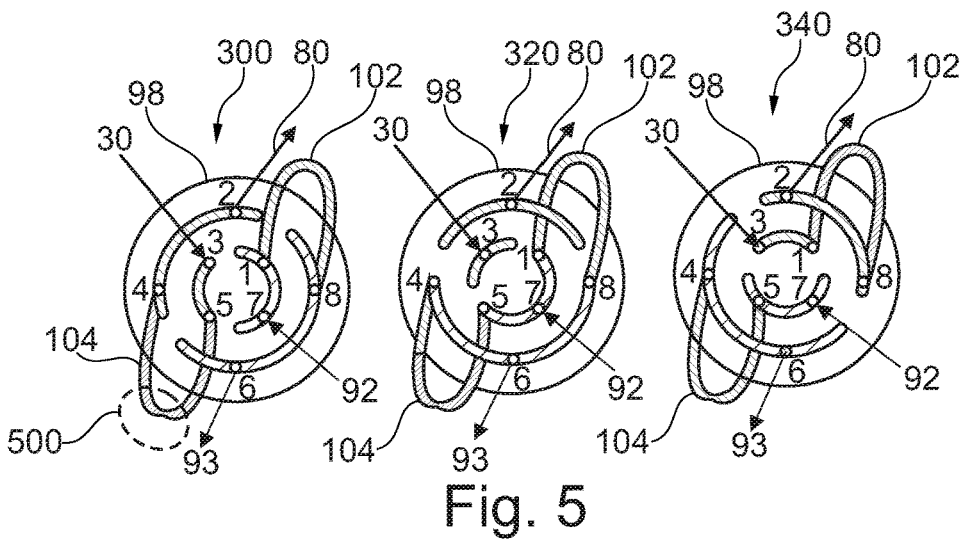
FIG. 5 is an illustration of a dual loop sampling valve for two-dimensional liquid chromatography, wherein one of the two loops has a higher fluidic restriction than the other one of the two loops, so that two fluid accommodation volumes with different flow through properties are present.

FIG. 5 is an illustration of modulator valve 98 for a scenario, in which the flow through properties of the two fluid accommodation volumes 102, 104 are different, as indicated schematically by a pronounced fluidic restriction zone 500 (indicated as narrow neck) in the fluid accommodation volume 104. In other words, FIG. 5 shows a dual loop sampling valve, in which one of the two loops (i.e., the fluid accommodation volume 104 connecting ports 4 and 5 in this case) is more restrictive concerning the flow of fluid therethrough than the other.

As can be taken from FIG. 5, the three switching states 300, 320 and 340 correspond to the situation of FIG. 3. However, once the flow restriction of the loops is different for any reason, the flows are unequal (see FIG. 6 and FIG. 7, described below), i.e. one of the loops will always carry a majority of the flow when the loops are connected in parallel.

Figure 6:
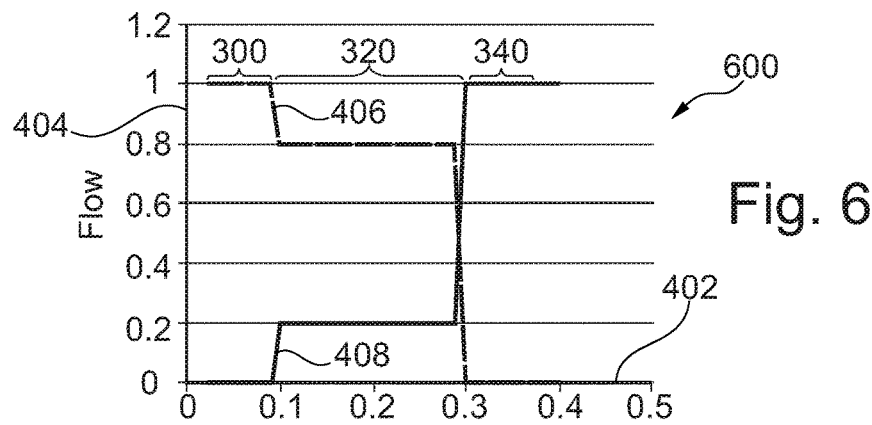
FIG. 6 is a diagram showing contributions of flow through each sample loop, according to FIG. 5, to the total second dimensional flow as a function of time.
Figure 7:
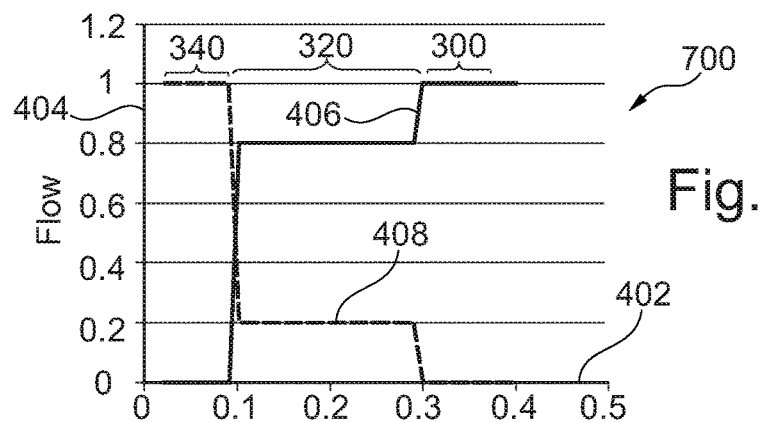
FIG. 7 is another diagram showing contributions of flow through each sample loop, according to FIG. 5, to the total second dimensional flow as a function of time.

FIG. 6 and FIG. 7 show diagrams 600 and 700, respectively, corresponding to FIG. 4. The difference between FIG. 6 and FIG. 7 is the rotation direction of the modulator valve 98 (forward and backward). Diagrams 600 and 700 show the contribution of flow through each sample loop to the total second dimension flow as a function of time. Here, the valve switching period runs from 0.1 to 0.3, and between these times there is unequal flow through the two fluid accommodation volumes 102, 104 that are connected in parallel to both the fluid drive unit 92 of the second dimension and the separation unit 93 of the second dimension. Because the fluid accommodation volume 104 is more restrictive than the fluid accommodation volume 102 in terms of fluid flow therethrough, the fluid accommodation volume 104 only carries 20% (as an example value) of the total flow to the second dimension separation column when the two loops are connected in parallel.

Thus, when the restricted loop carries the fluidic sample, it will be leaving the restricted loop more slowly; conversely, when the sample is delivered from the loop with lower restriction, it will be displaced into the second dimension eluent stream more quickly than in the case of equal loops. The net effect of these phenomena is that the sample introduction event will be shifted in time relative to the mechanical motion of the valve. To be more precise, the center of the mass, i.e. the first mathematical moment of the analyte zone, will be shifted in space and time relative to the motion of the valve. The magnitude of this shift depends on how much mobile phase of the second dimension passes through the loop that does not contain any analyte before the entire analyte-containing volume is displaced from the loop, or before the parallel switching state ceases. The magnitude of the shift can be elucidated experimentally and/or mathematically. Another case of the alternating sample introduction behavior is linked to a difference in the volumes in the loops or paths on the switchable sides of the modulator valve that can result from a variety of physical factors, starting with tolerances of the connection capillaries or asymmetric design or occasional valve component asymmetry and/or tolerances. Specifically, in case of usage of 10/2 valve scheme (A. van der Horst, P. Schoenmakers, Journal of Chromatography A, 1000 (2003) 693-709), the transport volumes from either of the loops are different per design. All of these may cause a predictable, measurable and repeatable relation between the valve switching event and the sample introduction (into the second dimension eluent) event, where the time span between these events will be dependent on the exact switching pattern as described above. Thus, several events or states are relevant in this context:

1. valve switching (which can be characterized by any defined state of the valve or phase of its operation)

2. sample introduction (which can be characterized by a reference point in time or momentary distribution of the sample in the second dimension flow path related to the first moment of the sample once the entire sample plug experiences full flow, i.e. no part of it is being shifted with a partial split flow);

3. analysis start in the second dimension, which is typically characterized by a solvent gradient starting point and data acquisition starting point. It is not reasonable to divide these two events apart, so it is preferable to maintain a fixed relationship between them for the duration of one experiment. This relationship can be based on analysis time or analysis volume.

According to an exemplary embodiment of the invention, it is possible to cleave the rigid connection between the execution of events 1 and 3, and instead execute events 1 and 3 at times that vary relative to event 2, with the goal of maintaining consistency in the repetition pattern of event 2 across the two-dimensional liquid chromatography analysis. It is possible to adjust the solvent gradient start time (for instance as in FIG. 9). It is also possible to adjust the second dimension pump operation (flow rate) between the gradient executions such that the volume-based gradient profiles remain equal.

Figure 10:
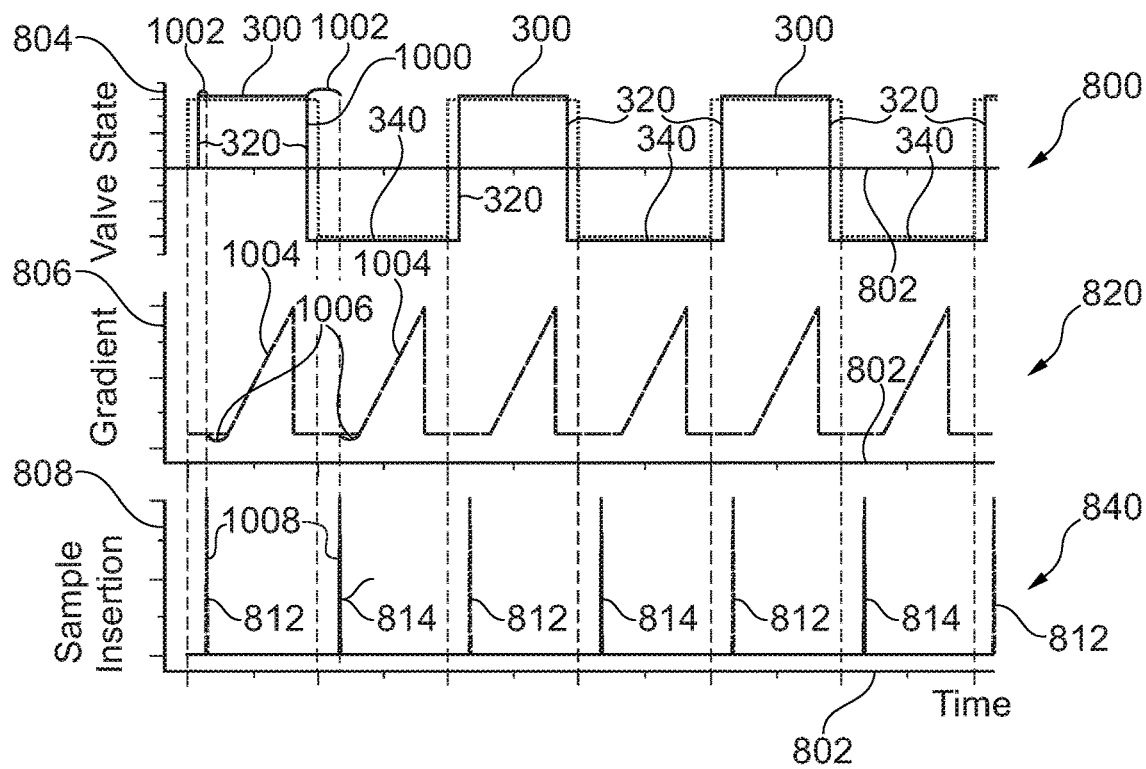
FIG. 10 illustrates schemes showing time dependent events in the case where execution of valve switching events is varied in time according to another exemplary embodiment of the invention so that sample introduction events are aligned with a regular timing grid, and are aligned with the execution of gradient start events.

Once the sample introduction event is executed in a predictable, measurable, or regular relation to the valve switching event, it is also possible to keep the analysis (solvent gradient execution) grid or timing regular and unchanged by adjusting the timing of the valve switching event using the knowledge about the sample introduction delay depending on the specific valve switching transition, as shown in FIG. 10.

As a consequence, the sampling times and sampling durations will become asymmetric relative to the first dimension separation, as these are also linked to the modulation valve switching events. However, this (both irregularity of the sampling time points and sampling durations) can be taken into consideration in an appropriate data processing scheme. In addition, working in a loop overfill mode can eliminate the effect of different sampling durations, as the sampled volume will be defined by the loop volume.

Furthermore, it is possible to combine adaptation of gradient timing and valve switching timing, i.e. it is also possible to adjust both for compensating different flow through properties.

Figure 8:
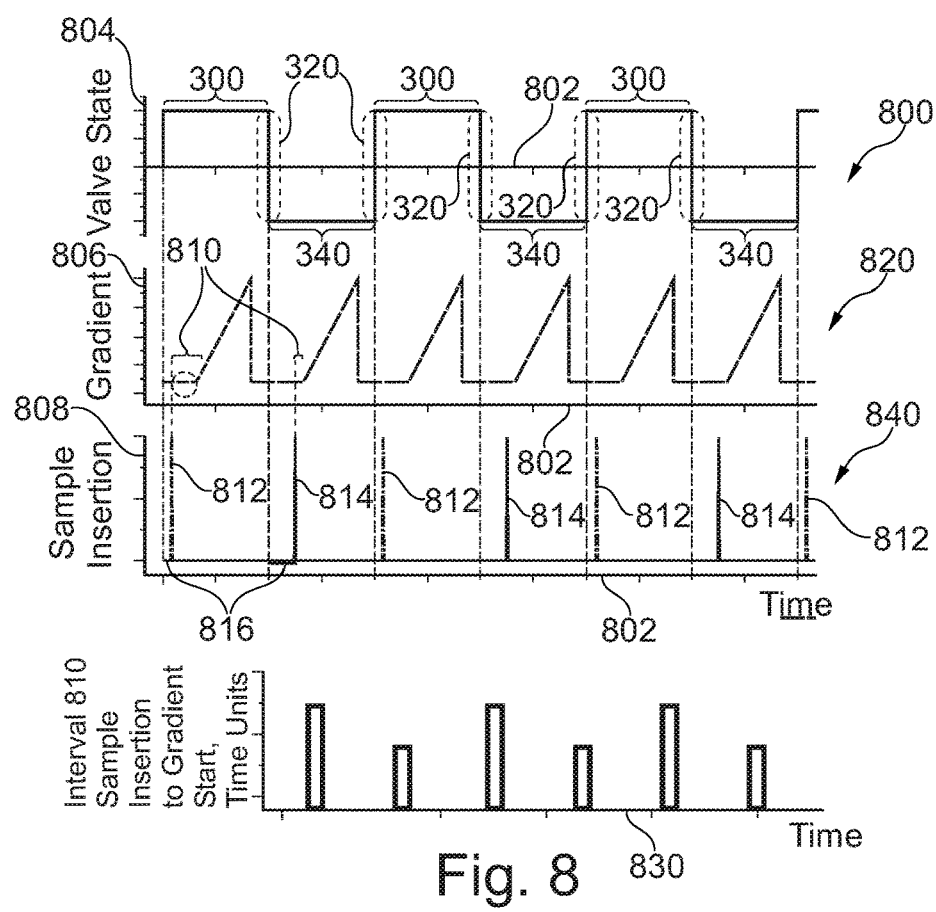
FIG. 8 illustrates schemes showing time dependent events in the case of strict periodic switching of a modulation valve, and rigidly linked gradient execution which results in a binary jitter in the timing of sample introduction events with respect to the gradient execution.
Figure 9:
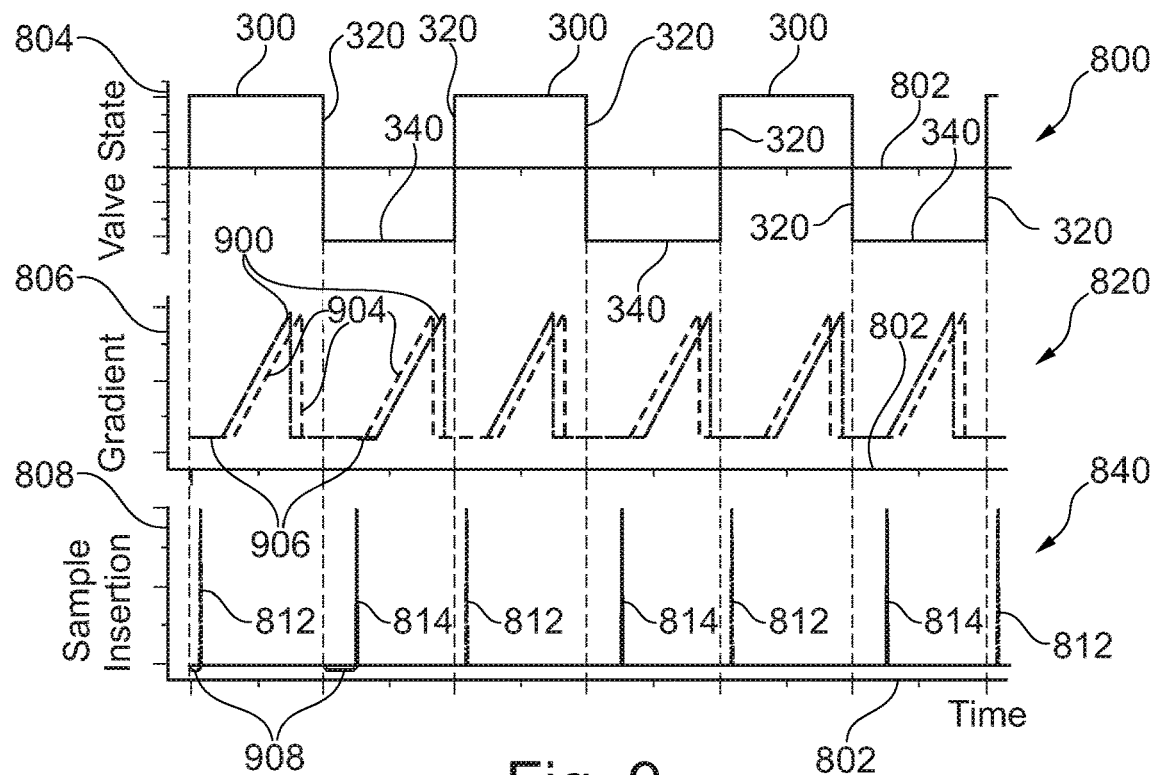
FIG. 9 illustrates schemes showing time dependent events in the case of adjusting gradient start time according to an exemplary embodiment of the invention which equalizes relative distances between the sample introduction events and gradient start events.

FIG. 8 shows diagrams 800, 820 and 840. Each of diagrams 800, 820 and 840 has an abscissa 802 along which the time is plotted. An ordinate 804 of diagram 800 illustrates a present switching state of the modulator valve 98. An ordinate 806 of diagram 820 illustrates a present state of a chromatographic method in which a gradient profile is applied for separating the fluidic sample. An ordinate 808 of diagram 840 illustrates sample insertion events, i.e. points of time at which a portion of fluidic sample is introduced into the second separation stage. In FIG. 9 and FIG. 10, corresponding diagrams 800, 820 and 840 are shown.

Diagrams 800 in FIG. 8 to FIG. 10 show the points of time of switching between switching modes 300, 320, 340. Although switching mode 320 is illustrated, for the sake of simplicity, with a substantially vertical line, switching mode 320 in practice also lasts for a certain time interval.

Diagrams 820 in FIG. 8 to FIG. 10 show gradient profiles of the various separation procedures in the second separation dimension. According to FIG. 8, which relates to the conventional situation of binary jitter due to the absence of a control logic according to an exemplary embodiment of the invention, binary jitter (see also merely schematic detail 830) occurs in time intervals 810, which represent the time intervals between the event of the sample entrance to the second dimension (referenced to a certain defined sample plug location, e.g. passage of the sample plug center of mass through the inlet of the separation unit 93) and the start of a respective gradient run (indicated by the ramps in diagrams 820).

Diagrams 840 in FIG. 8 to FIG. 10 show points of time 812, 814 at which fluidic sample is inserted from a respective one of the fluid accommodation volumes 102, 104 for separation in the second dimension. More specifically, points of time 812 relate to fluidic sample insertion from fluid accommodation volume 102, whereas points of time 814 relate to fluidic sample insertion from fluid accommodation volume 104. Since, compare FIG. 5, the restriction of fluid accommodation volume 104 is higher than the restriction of fluid accommodation volume 102, the delay of points of time 812 is smaller than the delay of points of time 814 in FIG. 8. This results in an unequal sample transport delay, as indicated schematically by reference numeral 816.

Hence, FIG. 8 shows time dependent events in the case of strict periodic switching of the modulation valve 98, and rigidly linked gradient execution (i.e. without control according to an exemplary embodiment of the invention). This results in a binary jitter in the timing of sample introduction events with respect to the gradient execution as explained above.

Now referring to FIG. 9, while valve switching has not been modified compared to FIG. 8 (see diagrams 800), gradient timing has been corrected for suppressing artifacts resulting from the different flow through properties of the fluid accommodation volumes 102, 104 (see diagrams 820). Corrected gradient timing is indicated by reference numeral 900, wherein non-corrected ordinary gradient timing is indicated for comparison with reference numeral 904 (dash line). In other words, an equalized sample insertion delay is obtained, see reference numeral 906. Thus, in terms of sample insertion points of time 812, 814, an unequal sample transport delay (caused by unequal restrictions of accommodation volumes 102, 104) is compensated in reference to the gradient start, although the sample insertion periodicity is still prone to jitter as it was the case in the FIG. 8, compare reference numeral 908.

Hence, FIG. 9 shows time dependent events in the case where adjusting gradient start time equalizes relative distances between the sample introduction events and gradient start events. In this case asymmetry is introduced into time spans between successive gradients, which may influence the system re-equilibration state in successive gradients.

Now referring to FIG. 10, valve switching has been adjusted compared to FIG. 8 (see diagrams 800) for suppressing artifacts resulting from the different flow through properties of the fluid accommodation volumes 102, 104, whereas gradient timing has not been modified (see diagrams 820). Corrected valve switching timing is indicated by reference numeral 1000, and the unequal sample transport delay is indicated with reference numeral 1002. The non-corrected ordinary gradient timing or unchanged strictly repetitive gradient timing is indicated with reference numeral 1004. Consequently, a regular periodic corrected jitter-free sample insertion pattern is obtained, see reference numeral 1006. Moreover, in terms of sample insertion points of time 812, 814, corrected jitter-free periodic sample insertion events are obtained, compare reference numeral 1008.

Hence, FIG. 10 shows time dependent events in the case where execution of valve switching events is varied in time so that sample introduction events are aligned with a regular timing grid, and are aligned with the execution of gradient start events.

The possible consequence of this latter correction approach is inequality of the sampling durations in the first dimension, once the same modulation valve is modulating also the first dimension flow. However, this effect is meaningless in the case of loop overfill sampling mode and still can be compensated for in course of the data evaluation (e.g. by scaling the detector response for second dimension runs with the actually applied sampling duration 300 or 340 for the corresponding sample) if operation in the loop underfill mode is mandatory.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A control device for controlling at least part of a sample separation apparatus for separating a fluidic sample, the sample separation apparatus comprising:
   at least two fluid accommodation volumes in fluid communication with a source of the fluidic sample, the at least two fluid accommodation volumes having different flow through properties and each being configured to receive the fluidic sample and temporarily accommodate the fluidic sample, wherein the fluidic sample in each of the at least two fluid accommodation volumes comprises a plurality of fractions to be separated by a separation unit of the sample separation apparatus, and
   wherein the control device is at least programmed to control an operation of the sample separation apparatus comprising:
   at least partially compensating for sample separation artifacts contained in sample separation result data obtained from the separated sample, the sample separation artifacts resulting from the different flow through properties of the at least two fluid accommodation volumes, by, in accordance with the different flow through properties, adjusting a timing of a start and/or an end of introducing the fluidic sample from at least part of the at least two fluid accommodation volumes into a flow path towards the separation unit.

2. The control device according to claim 1, wherein the control device is programmed to control an operation mode of the sample separation apparatus in which partial flows of fluids accommodated in the at least two fluid accommodation volumes are combined in the flow path for subsequent separation by the separation unit, and wherein the sample separation artifacts originate from the operation mode.

3. The control device according to claim 1, wherein the operation comprises at least partially compensating for sample separation artifacts by, in accordance with the different flow through properties, adjusting a timing of a start and/or an end of applying a mobile phase profile for sample separation.

4. The control device according to claim 1, wherein the operation comprises at least partially compensating for the sample separation artifacts by, in accordance with the different flow through properties, adjusting a timing of switching a fluidic switch in fluid communication with the at least two fluid accommodation volumes.

5. The control device according to claim 1, wherein the operation comprises at least partially compensating for the sample separation artifacts by, in accordance with the different flow through properties, adjusting a mobile phase profile according to which the sample separation is executed.

6. The control device according to claim 1, wherein the operation comprises at least partially compensating for the sample separation artifacts by, in accordance with the different flow through properties, recalculating the sample separation result data.

7. The control device according to claim 1, wherein the operation comprises at least partially compensating for the sample separation artifacts by, in accordance with the different flow through properties, performing a numerical baseline correction to thereby correct jitter in the sample separation result data.

8. The control device according to claim 1, wherein the different flow through properties are selected from the group consisting of: different volume values; different fluidic restrictions; different flow path lengths; and tolerances of the at least two fluid accommodation volumes.

9. A sample separation apparatus for carrying out a series of separations of a fluidic sample, the sample separation apparatus comprising:
the control device of claim 1;
the source of the fluidic sample; and
a sample separation device fluidically coupled to the source of the fluidic sample and configured for separating at least a portion of the fluidic sample supplied by the source of the fluidic sample,
wherein different sequential portions of the fluidic sample are to be guided through the at least two fluid accommodation volumes prior to the separation by the stage sample separation device.

10. The sample separation apparatus according to claim 9, wherein the at least two fluid accommodation volumes are fluid buffer volumes each of which being configured for temporarily buffering a predefined volume of the fluidic sample during operation of the sample separation apparatus.

11. The sample separation apparatus according to claim 9, comprising a modulator valve configured for being switchable for subsequently introducing portions of the fluidic sample from the source of the fluidic sample into the sample separation device.

12. The sample separation apparatus according to claim 11, wherein each of the at least two fluid accommodation volumes is fluidically connected to the modulator valve so that different portions of the fluidic sample are temporarily bufferable in the respective fluid accommodation volumes.

13. The sample separation apparatus according to claim 11, wherein the control device is configured for switching the modulator valve so that:
in a first switching state, only a first one, not a second one of the at least two fluid accommodation volumes is fluidically connected to the sample separation device;
in a second switching state, only the second one, not the first one of the at least two fluid accommodation volumes is fluidically connected to the sample separation device; and
in a third switching state, both the first one and the second one of the at least two fluid accommodation volumes are fluidically connected to the sample separation device.

14. The sample separation apparatus according to claim 13, wherein the control device is configured for at least partially compensating sample separation artifacts occurring due to the third switching state.

15. The sample separation apparatus according to claim 9, comprising at least one of the following features:
at least one of the source of the fluidic sample and the sample separation device is configured as a chromatography sample separation apparatus;
at least one of the source of the fluidic sample and the sample separation device comprises a fluid drive unit configured for driving a mobile phase and fluidic sample in the mobile phase;
at least one of the source of the fluidic sample and the sample separation device comprises a separation unit configured for separating at least a portion of the fluidic sample;
the source of the fluidic sample comprises an injector configured for injecting the fluidic sample into a mobile phase;
at least one of the primary source of the fluidic sample and the secondary stage sample separation device comprises a detector configured to detect separated fractions of at least a portion of the fluidic sample;
the sample separation device comprises a fractioner unit configured to collect separated fractions of the fluidic sample;
the control device is configured to process data related to sample separation by at least one of the source of the fluidic sample and the sample separation device;
at least one of the source of the fluidic sample and the sample separation device comprises a degassing apparatus for degassing mobile phase; and
the source of the fluidic sample is configured as a primary stage sample separation device for separating the fluidic sample prior to a subsequent further separation of the fluidic sample by the sample separation device configured as a secondary stage sample separation device.

16. A control device for controlling at least part of a sample separation apparatus for separating a fluidic sample, the sample separation apparatus comprising:
at least two fluid accommodation volumes in fluid communication with a source of the fluidic sample, the at least two fluid accommodation volumes having different flow through properties and each being configured to receive the fluidic sample and temporarily accommodate the fluidic sample, wherein the fluidic sample in each of the at least two fluid accommodation volumes comprises a plurality of fractions to be separated by a separation unit of the sample separation apparatus, and
wherein the control device is at least programmed to control an operation of the sample separation apparatus comprising:
at least partially compensating for sample separation artifacts contained in sample separation result data obtained from the separated sample, the sample separation artifacts resulting from the different flow through properties of the at least two fluid accommodation volumes, by, in accordance with the different flow through properties, recalculating the sample separation result data.

17. A method of controlling at least part of a sample separation apparatus for separating a fluidic sample, the sample separation apparatus comprising at least two fluid accommodation volumes in fluid communication with a source of the fluidic sample, the at least two fluid accommodation volumes having different flow through properties and each being configured for receiving the fluidic sample and temporarily accommodating the fluidic sample, wherein the fluidic sample in each of the at least two fluid accommodation volumes comprises a plurality of fractions to be separated by a separation unit of the sample separation apparatus, the method comprising:
controlling an operation of the sample separation apparatus to at least partially compensate for sample separation artifacts contained in sample separation result data obtained from the separated sample, the sample separation artifacts resulting from the different flow through properties of the at least two fluid accommodation volumes by, in accordance with the different flow through properties, adjusting a timing of a start and/or an end of introducing the fluidic sample from at least part of the at least two fluid accommodation volumes into a flow path towards the separation unit.

18. The method according to claim 17, wherein the at least partial compensation is carried out by a one-time calibration of the sample separation apparatus.

19. The method according to claim 17, wherein the at least partial compensation is carried out by tuning the sample separation apparatus at a user side.

20. The method according to claim 17, wherein the at least partial compensation is carried out by operating the sample separation apparatus with a set of artifact suppressing operation parameters.

* * * * *